United States Patent [19]

Troster et al.

[11] Patent Number: 4,723,851
[45] Date of Patent: Feb. 9, 1988

[54] DOUBLE-ROW ANGULAR-CONTACT BALL BEARING

[75] Inventors: Manfred Troster, Bad Kissingen; Heinrich Hofmann, Schweinfurt, both of Fed. Rep. of Germany

[73] Assignee: FAG Kugelfischer Georg Schafer (KGaA), Fed. Rep. of Germany

[21] Appl. No.: 930,665

[22] Filed: Nov. 12, 1986

[30] Foreign Application Priority Data

Nov. 13, 1985 [DE] Fed. Rep. of Germany ....... 3540224

[51] Int. Cl.$^4$ ............... F16C 33/38; F16C 33/40; F16C 33/60; F16C 33/64
[52] U.S. Cl. ........................... 384/523; 384/504; 384/506; 384/512; 384/526; 384/539; 384/544
[58] Field of Search ................ 384/504–506, 384/512, 523, 526, 527, 531, 534, 539, 544, 572, 576

[56] References Cited

U.S. PATENT DOCUMENTS

| | | | |
|---|---|---|---|
| 3,495,889 | 2/1970 | Nisbet et al. | 384/526 X |
| 3,975,066 | 8/1976 | Hofmann et al. | 384/526 |
| 4,153,309 | 5/1979 | Markfelder et al. | 384/576 |
| 4,330,160 | 5/1982 | Stolz et al. | 384/531 |
| 4,398,775 | 8/1983 | Hofmann et al. | 384/527 X |

FOREIGN PATENT DOCUMENTS

| | | | |
|---|---|---|---|
| 2739367 | 10/1978 | Fed. Rep. of Germany | 384/576 |
| 3318945 | 11/1984 | Fed. Rep. of Germany | 384/526 |
| 2308013 | 11/1976 | France | 384/531 |
| 2134992 | 8/1984 | United Kingdom | 384/512 |
| 1128009 | 12/1984 | U.S.S.R. | 384/512 |

Primary Examiner—Stuart S. Levy
Assistant Examiner—Thomas R. Hannon
Attorney, Agent, or Firm—Ostrolenk, Faber, Gerb & Soffen

[57] ABSTRACT

A double-row, angular-contact ball bearing unit includes double sided cage, a plurality of balls maintained in first and second circular arrays by the cage and disposed between a one piece outer ring having two races and an inner ring formed of two side by side sections, each having an individual race. Angled deflectible locking fingers extend inwardly from the cage into a locking groove in the inner ring section for the first array at a location between the arrays of balls, and this section extends sideways into the region of the second array. The outer ring is undercut from the outer race having the second array to the side of the outer ring that is remote from the first array. The cage side for the first array is of the comb-type and the cage side for the second array is of the window-type.

12 Claims, 4 Drawing Figures

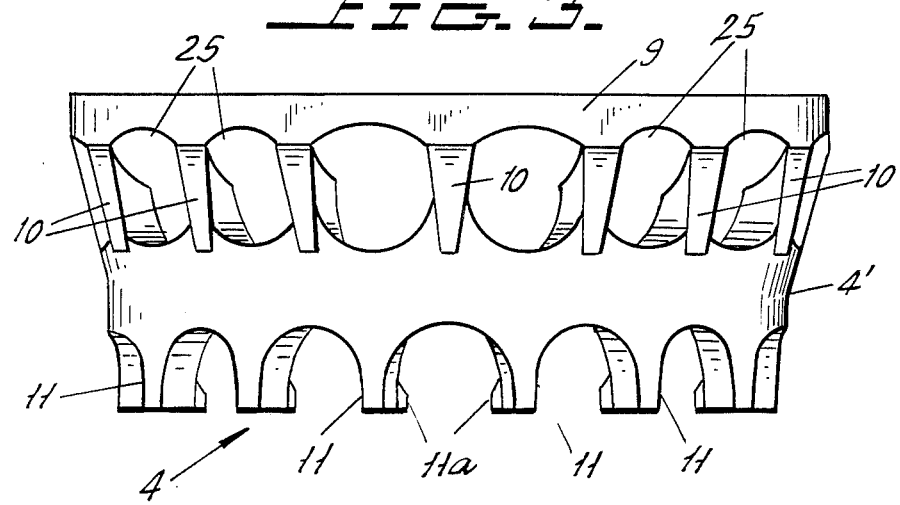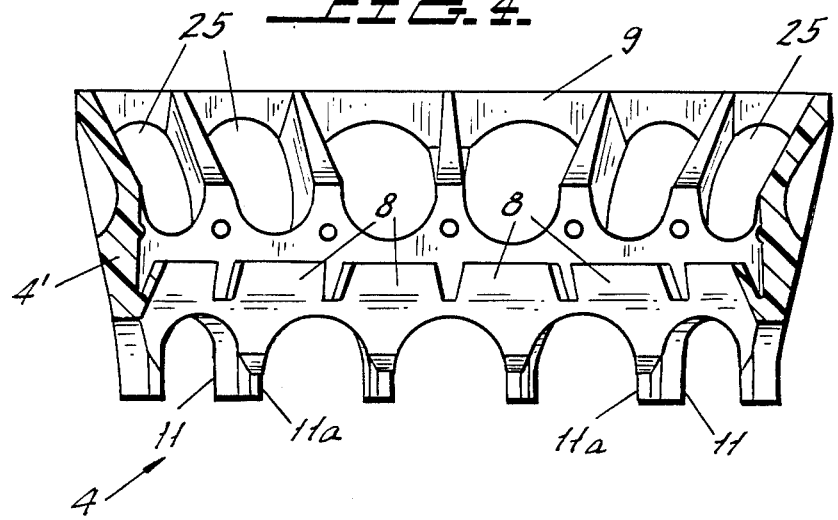

DOUBLE-ROW ANGULAR-CONTACT BALL BEARING

BACKGROUND OF THE INVENTION

The present invention relates generally to double-row angular-contact ball bearings and relates more particularly to ball bearings of this type having an inner ring section which extends into the region of the ball bearing array that is supported by the other inner ring section.

Double-row ball bearings of the type with which this invention is concerned are described in Federal Republic of Germany Pat. No. 30 27 485. In order to obtain a unitary bearing unit with a one piece ring having two races and a two piece ring with each section thereof having a bearing race, the bearing elements are maintained in assembled relationship by including a so-called double-comb cage having projections which extend into a groove in the divided race ring. That design is possible only if sufficient space is present axially for the grooves in the race rings, which groove must be arranged alongside the raceways. In cases in which one of the race ring sections is made substantially longer in the axial direction than the other ring section, in order to transmit higher axial and tilting forces the longer ring section extends into the region of the balls supported by the other ring section. Prior art constructions are not suitable for maintaining elements in assembled relationship.

OBJECTS OF THE INVENTION

Accordingly, the primary object of the present invention is to provide a novel construction for a double-row angular-contact ball bearing unit that includes a cage having projections for maintaining bearing elements in their respective operating positions, even if one of two sections constituting a split inner race extends axially into the region of the balls that ride on the other of the two ring sections.

This object is achieved by utilizing a cage that is developed in window form on one side so that the balls on this side cannot move away from the one piece outer ring even if that ring does not have a side shoulder to retain these balls. Instead, these balls are held axially against the outer ring by the cage and the other row of balls. In the event the ring sections are arranged alongside of each other, one section has a groove that receives the cage projections and the other or groove-less ring section is held in its operative position by having its raceway provided with shoulders along both sides thereof.

In the event that the sections of the split ring are pushed one onto the other, the grooved inner ring section is secured to an axial extension of the other inner ring section by a press seat. With this construction the inner shoulder on the groove-less inner ring is unnecessary.

Another object of this invention is to provide a novel double-row ball bearing unit including a cage that is simple to construct and is easily installed.

Still another object of this invention is to provide a novel double-row ball bearing unit that includes a cage that is a window-type on one side and an open-ended finger-type on the other side.

A further object of this invention is to provide a novel double-row ball bearing unit in which the cage arms are extended radially to engage behind the balls when they are pushed radially from their normal operating positions during installation of these balls.

BRIEF DESCRIPTION OF THE DRAWINGS

These objects as well as other objects of this invention shall become readily apparent after reading the following description of the figures in which:

FIG. 3 is an enlarged side elevation of the cage; and

FIG. 4 is a view similar to that of FIG. 3 with the near half of the cage broken away.

DETAILED DESCRIPTION OF THE PREFERRED EMBODIMENTS

Figure 1:
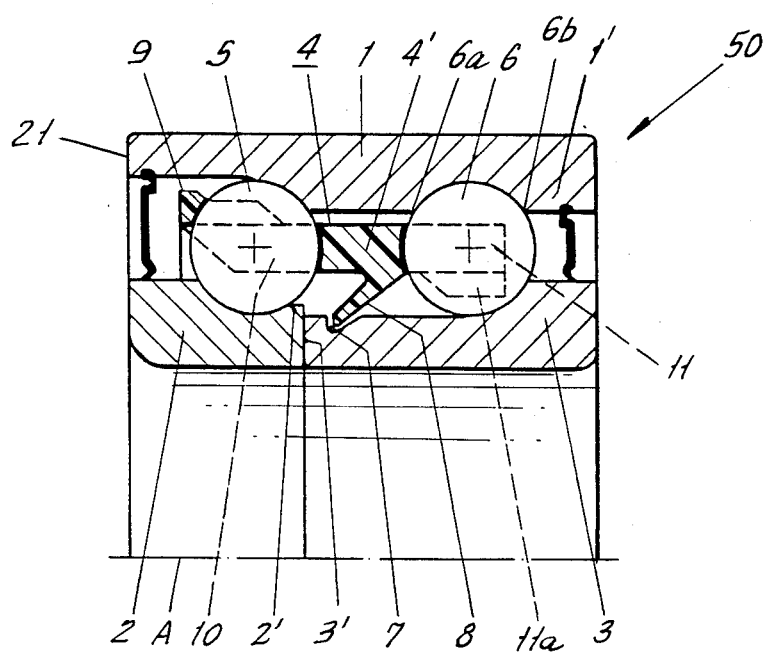
FIG. 1 is a partial cross section through a bearing unit constructed in accordance with teachings of the instant invention.

The double-row angular-contact O-arrangement ball bearing unit 50 shown in FIG. 1 includes one piece outer ring 1, two inner ring sections 2 and 3, molded plastic cage 4 and two circular arrays of balls 5 and 6, all of which are concentric with respect to rotational axis A. Outer ring 1 has no shoulder on its left axial side. That is, outer ring 1 is undercut from the deepest part of its race for balls 5 to left face 21. In outer ring 1 the race for balls 6 is provided with shoulders 6a, 6b along opposite sides thereof.

The inner ring sections are asymmetric, with section 3 being axially wider and extending up axially to the area radially inside ball array 5. Left or resting side surface 3' of inner ring section 3 extends up into the axial region of the array of balls 5 thereby providing an axially extensive area for annular locking groove 7 into which radial projections or locking fingers 8 of cage 4 are snapped. In this way outer ring 1, cage 4, the array of balls 6 and inner ring 3 are connected to form a subassembly. In order for the array of balls 5 to be held fast on this subassembly, cage 4 is of window shape on the side of the row of balls 5, as indicated by ring section 9. The latter is connected to middle ring part 4' of cage 4 by means of axial arms 10. Axially narrow inner ring section 2 is positioned axially in one direction by abutment with wide inner ring section 3 at seating interface 3' and in the other direction through the cooperation of balls 5 and shallow shoulders 3' at the right side of the inner race for balls 5.

In order to permit cage pockets 25 for the balls of array 5 to be produced by an axial displacement device, ring part 9 is disposed radially outside of central ring part 4' of cage 4. Further, while it is not necessary for outer ring 1 to have shoulder 1', when shoulder 1' is provided on the right side of outer ring 1 in the region of balls 6, the axially extending comb-teeth arms 11 of cage 4 are each provided with a short radially extending arm section 11a. Upon installation, the balls of array 6 can then move radially inward when they are pushed over the outer shoulder 1' with arm sections 11 engaging behind balls 6 at this time.

Figure 2:
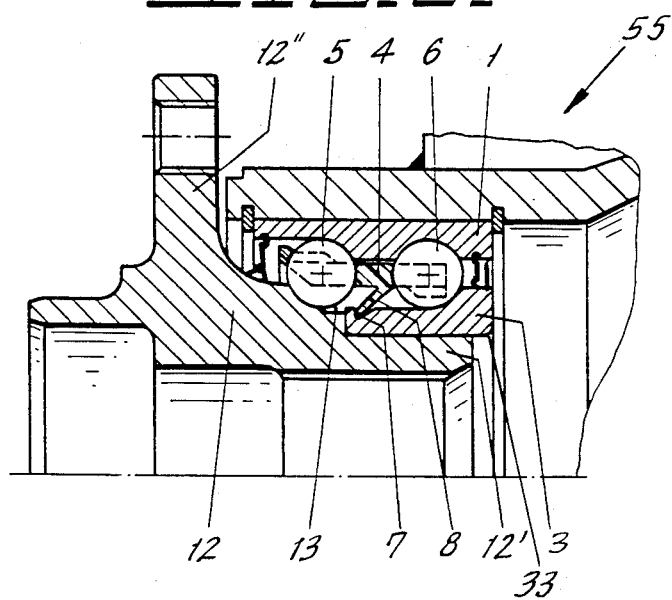
FIG. 2 is a view similar to that of FIG. 1 and showing a second embodiment of this invention.

FIG. 2 illustrates bearing 55 which is very similar to bearing 50 of FIG. 1, the essential difference being the construction of groove-less inner ring section 12. The latter includes axial extension 12' on its right side. Extension 12' is force fitted into central bore 33 of inner ring section 3. Fastening flange 12" is formed on the left side of inner ring section 12.

Instead of the small shoulder 2' of FIG. 1, which is also permissible in the embodiment of FIG. 2, to facilitate installation free space or undercut 13 is provided on inner ring 12 to the right of the inner race for balls 5.

Although the present invention has been described in connection with a preferred embodiment thereof, many variations will now become apparent to those skilled in the art. It is preferred, therefore, that the present invention be limited not by the specific disclosure herein, but only by the appended claims.

What is claimed is:

1. A double-row angular-contact ball bearing unit including:
    outer ring means, inner ring means, a first and a second circular array of balls interposed between said inner and outer ring means, and cage means for maintaining spacings between the balls constituting said first and second arrays;
    said inner ring means comprising a first element having a first inner race into which balls of said first array extend, and a second element having a second inner race into which balls of said second array extend;
    said first and second elements having respective confronting first and second surfaces which face axially toward each other;
    said first confronting surface extends to an axial position that is between first and second planes defining the position of the balls of the second array therebetween with the outer surfaces of these balls in engagement with the planes;
    the planes being perpendicular to the rotational axis of the bearing unit;
    said first element having an annular locking groove and said cage means having deflectable locking fingers with free end portions that are received by said locking groove;
    said outer ring means comprising a single element having a first outer race into which balls of said first array extend and a second outer race into which balls of said second array extend; said outer ring means having an annular undercut extending from said second outer race at its deepest portion to a face of said outer ring means remote from said first outer race, said undercut being generally uniform in a radial direction.

2. A ball bearing unit as set forth in claim 1, in which said cage means includes side-by-side first and second sections for positioning the balls of the respective first and second arrays;
    said second section comprising a window type cage including an annular section disposed remote from said first section and is offset in a radial direction from a circle that passes through the centers of the balls of said second array.

3. A ball bearing unit as set forth in claim 2 in which the annular section of the window type cage is of diameter that is greater than that of said circle.

4. A ball bearing unit as set forth in claim 2 in which said first section comprises a plurality of generally axially extending arms having free ends extending away from said second array;
    each of said free ends being provided with an individual short radially inward extending arm, said arms operatively retaining the ball of the first array even during installation thereof when they shift radially from their normal positions.

5. A ball bearing unit as set forth in claim 1 in which said cage means includes side-by-side first and second sections for positioning the balls of the respective first and second arrays;
    said first section comprising a plurality of generally axially extending arms having free ends extending away from said second array;
    each of said free ends being provided with an individual short radially inward extending arm, said arms operatively retaining the ball of the first array even during installation thereof when they shift radially from their normal positions.

6. A ball bearing unit as set forth in claim 1 in which said first element has a second undercut extending from said first inner race at its deepest portion to the respective press surface of said first element.

7. A ball bearing unit as set forth in claim 6 in which said second element includes an axially extending section that extends into a central opening of said first element.

8. A ball bearing unit as set forth in claim 7 in which the axially extending section is force fitted within said central opening, and said surfaces are in abutting relationship.

9. A ball bearing unit as set forth in claim 1 in which the locking fingers slant radially inward and toward the second element of the inner ring means.

10. A ball bearing unit as set forth in claim 1 in which there are radially outward shoulders along both sides of said second inner race.

11. A ball bearing unit as set forth in claim 10 in which said cage means includes side-by-side first and second sections for positioning the balls of the respective first and second arrays;
    said second section comprising a window type cage including an annular section disposed remote from said first section and is offset in a radial direction from a circle that passes through the centers of the balls of said second array.

12. A ball bearing unit as set forth in claim 11 in which the annular section of the window type cage is of diameter that is greater than that of said circle.

* * * * *